(12) United States Patent
Colvin et al.

(10) Patent No.: US 8,651,054 B2
(45) Date of Patent: Feb. 18, 2014

(54) BIRD FEEDER WITH REMOVABLE PORTS

(75) Inventors: Barry D. Colvin, Bristol, RI (US); Rolf Richter, East Greenwich, RI (US)

(73) Assignee: Aspects, Inc., Warren, RI (US)

( * ) Notice: Subject to any disclaimer, the term of this patent is extended or adjusted under 35 U.S.C. 154(b) by 158 days.

(21) Appl. No.: 13/179,710

(22) Filed: Jul. 11, 2011

(65) Prior Publication Data

US 2012/0006272 A1 Jan. 12, 2012

Related U.S. Application Data

(60) Provisional application No. 61/362,967, filed on Jul. 9, 2010.

(51) Int. Cl.
*A01K 61/02* (2006.01)

(52) U.S. Cl.
USPC ........ 119/57.8; 119/52.2; 119/57.9; 119/52.3

(58) Field of Classification Search
USPC ......... 119/51.01, 57.8, 52.1, 52.2, 57.9, 52.3, 119/51.11, 53, 61.3, 61.31, 429, 72, 74, 119/72.5, 73, 75–81; D30/121, 124–128, D30/131, 132
See application file for complete search history.

(56) References Cited

U.S. PATENT DOCUMENTS

| | | | | |
|---|---|---|---|---|
| 6,378,458 | B1 * | 4/2002 | Boyd | 119/52.3 |
| 7,093,561 | B2 * | 8/2006 | Rich et al. | 119/57.8 |
| 7,261,056 | B2 * | 8/2007 | Hunter et al. | 119/57.8 |
| 7,506,611 | B1 * | 3/2009 | Lush | 119/52.1 |
| 8,459,206 | B1 * | 6/2013 | Colvin | 119/57.8 |
| 2008/0078329 | A1 * | 4/2008 | Hunter et al. | 119/57.8 |
| 2009/0283046 | A1 * | 11/2009 | Black | 119/52.3 |
| 2011/0067635 | A1 * | 3/2011 | Puckett et al. | 119/52.2 |

FOREIGN PATENT DOCUMENTS

GB 2270612 * 3/1994 ............. A01K 39/01

* cited by examiner

*Primary Examiner* — Andrea Valenti
(74) *Attorney, Agent, or Firm* — Barlow, Josephs & Holmes, Ltd.

(57) ABSTRACT

A bird feeder has a body member, a base, and at least one feed port member. The body member is used for storing bird food having a top end, a bottom end and a sidewall with the sidewall of the body member defining at least one feeding aperture. A base is attached to the bottom end of the body member to prevent bird food from exiting the body member. The at least one feed port member is interfittingly engaged within at least one feeding aperture. The port member includes a frame member and a mesh insert attached to the frame member. The feed port member is releasably secured within the feeding aperture of the body member. In operation, the feed port member can be easily removed from the body member for easy cleaning or adapting to a particular bird feeder construction.

4 Claims, 20 Drawing Sheets

BIRD FEEDER WITH REMOVABLE PORTS

CROSS REFERENCE TO RELATED APPLICATION

This application is related to and claims priority from earlier filed provisional patent application Serial No. 61/362,967, filed Jul. 9, 2010, the entire contents thereof is incorporated herein by reference.

BACKGROUND OF THE INVENTION

The present invention generally relates to bird feeders, namely tubular bird feeders. More specifically, the present invention relates to feed port members and mesh inserts within the feed ports for such tubular bird feeders.

In the bird feeder industry, tubular bird feeders are well known. These feeders include a tubular main feed body which is commonly transparent or translucent so the amount of feed remaining therein can be easily seen. Feed ports in the tubular body permit birds to gain access to the feed therein. A tubular bird feeder also typically includes a number of perches routed through or attached to the tubular body to support a bird during feeding through one of the feed ports.

A tubular bird feeder typically has an open top and bottom end. The top end is covered by a removable cap or lid so feed may be introduced into the tubular body. Bails are also provided so the feeder can be hung from a support, such as a hook or other structure. The bottom of the main tubular body is also closed, typically permanently, by a bottom base or cap. This base is usually screwed on, riveted or otherwise fixedly secured to the bottom of the tubular main body to keep it closed. A post mount can be provided in the bottom of the bottom cap. Typically a post mount is threaded into a female-threaded aperture in the bottom of the base.

The feed ports usually are permanently attached to the tubular body by a variety of methods. The feed port may include a frame for attaching to the tubular body, and a mesh portion. The mesh portion is typically selected to accommodate a certain range of size and type of bird feed mixes. Of course, the type of bird feed mix will determine the range of birds which will be attracted to the bird feeder. Therefore, the size and type of bird feed mixes that a bird feeder can accommodate will determine the limited range of birds that it can attract.

These known tubular feeders suffer from various problems that make them difficult to clean. Remaining amounts of feed typically accumulate at within the bird feeder including around the feed ports. When this feed mixes with rain, and the like, the feed around the feed ports becomes packed and dirty making it difficult, if not impossible, for birds to access it. Moreover, once the feed is wet and/or dirty, birds may not even wish to consume it. Since the feed ports of these known tubular feeders are secured to the tubular body, they are difficult to remove. If a feed port is permanently secured to the tubular body, it will not be able to be removed without possibly causing damage to the bird feeder. Threaded fasteners, rivets and other permanent devices are used to secure the feed ports to the tubular body. These fasteners require tools, such as a screwdriver or wrench, to remove the feed ports for cleaning the feeder. The requirement of tools increases the burden of cleaning a feeder and further makes a bird feeder owner less likely to clean their feeder. If, for example, rivets are used, it may not even be possible to remove the feed port at all to gain access to the interior portion of the feeder.

Bird feeders, specifically tubular bird feeders, are often difficult to clean due to its constructions. In most tubular bird feeders, the feed ports are permanently attached to the tubular body. To clean the tubular bird feeders, a user will often bring the bird feeder indoors to completely immerse the bird feeder in water which requires additional time and effort. Another method for cleaning the tubular bird feeders is to use a garden hose or faucet outdoors by spraying water into the interior of the bird feeder which often further pushes the seed into the feed port area which is difficult to remove.

Some feed ports are integrally constructed with the tubular body, making it more difficult to effectively clean the feeder. Thus, the feed port and the area surrounding the feed port are particularly hard to clean. To further cause cleanliness problems, feed ports are often formed of a separate construction from the tubular body.

Therefore, it is highly desirably to not only gain access to the feed ports of a bird feeder to clean it thoroughly to remove all of the dirt, grime and bacteria that has collected. Also, it is desirable to change the feed ports, based upon the mesh used, which will impact the types of bird feeder mixes that it can use effectively to attract birds. It is also desirable for a user to be able to easily change the feed ports for aesthetic reasons which are pleasing to a bird or a bird feeder owner. However, it is not possible to disassemble prior art feed ports from the tubular body because they are permanently attached thereto. As a result, there is a need for a feed port for a bird feeder than be easily detached from the tubular body so that it can be quickly and easily cleaned.

Also, there is a desire in the art of bird feeders to simplify and customize the assembly of feed ports to the bird feeders. As stated above, feed ports can be either integrally attached to the tubular body or permanently affixed thereto by rivets, fasteners and the like. There also needs to be a way to easily change a feed port so that a user can use a different variety of bird feed mixes and thereby attract a wider range of birds. Furthermore, there is a need for a feed port and mesh configuration where a frame of the feed port can be attached to a wide array of mesh sizes and shape to suit the user's preferences for purposes of using a variety of bird feeder mixes or aesthetic reasons.

For example, there is a desire for the same feed port to be used, but the mesh can be interchangeable depending on the seed type to be placed in feeder. Also, there is a desire for the same feed port to be compatible with feeders of different sizes to facilitate the manufacturing process by reducing the number of parts across a line of feeders. Also, it is possible that the user may wish to change the color of the feed port or mesh to, in turn, change the appearance of the feeder to add interest or, perhaps, attract different types of birds to the feeder.

BRIEF SUMMARY OF THE INVENTION

The present invention provides a solution to the problems associated with prior art bird feeders. As shown in the attached figures, the bird feeder of the present invention includes a new and novel removable feeder ports for cleaning purposes or adapting to a particular bird feeder constructions.

The bird feeder has a body member, a base, and at least one feed port member. The body member is used for storing bird food having a top end, a bottom end and a sidewall with the sidewall of the body member defining at least one feeding aperture. A base is attached to the bottom end of the body member to prevent bird food from exiting the body member.

The at least one feed port member is interfittingly engaged within at least one feeding aperture or sidewall of the tubular body member. The port member includes a frame member and a mesh insert attached to the frame member. The frame member includes a groove for seating the frame member within the sidewall of the tubular body member. The frame member includes upper and lower tab portions for keying the frame member to the sidewall of the tubular body member when positioned within the feeding aperture.

The mesh insert is interchangeable with one or other types of mesh inserts made of different materials or colors to provide a different ornamental appearance. In addition, the mesh insert is interchangeable with one or more other types of mesh inserts defining apertures having more than one size to accommodate a range of bird feed mixes. The mesh insert includes a spring-biased portion for engaging an upper portion of the frame and the sidewall of the tubular body member which acts to releasably secure the mesh insert within the sidewall of the tubular body member.

In operation, the feed port member can be easily removed from the tubular body member for easy cleaning or adapting to a particular bird feeder construction. A user can remove the feed port member by manipulating the spring-biased portion of the mesh insert to disengage from the side wall of the tubular body member and thereby remove the feed port member from the side wall. In addition, once the feed port member is removed, the user may clean the feed port member and the interior of the tubular body member more easily. Also, as an additional feature, the user may replace the mesh insert with a different type of mesh insert depending upon the size of the bird feed mixes or ornamental appearance. After cleaning or replacing the mesh insert, the user may then return the feed port member to engage the sidewall of the tubular body member within the feeding aperture.

Accordingly, an object of the present invention is the provision for a removable feed port member to facilitate cleaning of a bird feeder and adapting to a particular bird feeder construction.

Another object of the present invention is the provision for a removable mesh insert within the feed port member to accommodate a range of bird feed mixes and desired ornamental appearance In a further object of the present invention is the provision for bird feeder which has removable ports and a removable base to facilitate cleaning of the bird feeder.

In yet another object of the present invention is the provision of a removable feed port which is keyed to the sidewall of the body member for proper orientation of the feed port member

BRIEF DESCRIPTION OF THE DRAWINGS

These and other features, aspects, and advantages of the present invention will become better understood with reference to the following description, appended claims, and accompanying drawings where:

DETAILED DESCRIPTION OF THE PREFERRED EMBODIMENTS

Figure 1:
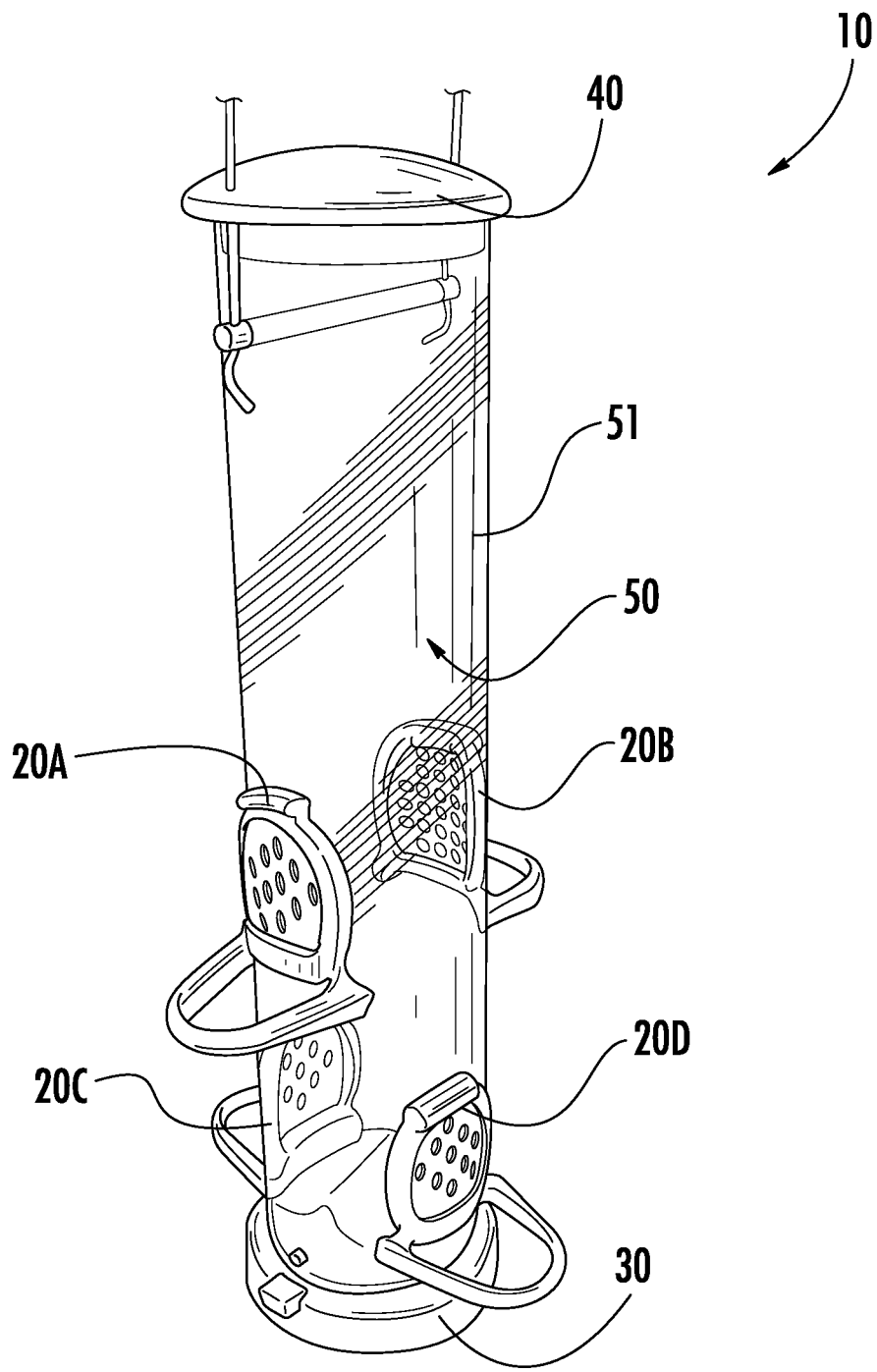
FIG. 1 is a perspective view of a bird feeder with removable feed port members.

In FIGS. 1-20, the bird feeder 10 of the present invention is shown. The bird feeder 10 of the present invention includes a new and novel removable feeder ports 20A-D that permits the entire feed port members 20A-D to be quickly and easily removed from a sidewall 51 of a body member 50 of the bird feeder 10 for cleaning purposes or adapting to a particular bird feeder 10 constructions. Also, the bird feeder 10 of present invention also includes a new and novel interchangeable mesh insert 24 that can be easily disassembled from the feed port member 20 to permit full and completely cleaning thereof. The mesh insert 24 also allows for the feed port member 20 to be used for a wide range of bird feeders where only the mesh insert 24 is changed for the given bird feeder construction. This obviates the need for multiple feed port members for a range of bird feeder constructions. Moreover, the feed port members 20A-D include interchangeable mesh inserts 24 to accommodate a user's preference for type of bird feed mix or ornamental appearance.

Referring to FIG. 1, the bird feeder 10 of the present invention includes a body member 50 sued for storing bird food, a base 30, cap or lid 40, and at least one or more feed port members 20A-D. The body member 50, preferably tubular body member, has a top end, a bottom end and the sidewall 51 with the sidewall 51 of the body member 50 defining at least one feeding aperture 51. The cap or lid 40 is permanently or releasably attached to the top end of the body member 50. In one embodiment, the lid 40 is a hinged lid which permits refilling of the interior of the body member 50 with bird seed. The base 30 is removably attached to the bottom end of the body member 50 to prevent bird food from exiting the body member 50. For example, the removable base 30 is previously described in U.S. patent application Ser. No. 11/745,484 entitled Removable Seed Deflector for a Bird Feeder filed May 8, 2007 by Aspects, Inc. and incorporated entirely herein by reference. The removable base 30 permits easier cleaning of the base 30 and the body member 50. Of course, the base 30 may also be permanently attached or releasably attached to the body member 50 by other means known in the art.

The side wall 51 of the body member 50 defines at least one or more feeding apertures 52A-D for securing the feed port member 20A-D therein. At least one feed port member 20A-D or more is interfittingly and respectively engaged within at least one or more feeding apertures 52 to provide an area where birds can rest and remove seed from the interior of the body member 50. In one embodiment, there are four feeding apertures 52A-D with four feed port members 20A-D respectively positioned therein. In one embodiment, a first pair of feed port members 20A-B opposes one another and resides within the feeding apertures 52A-B in a middle portion of the tubular body member 50. A second pair of feed port members 20C-D opposes one another and resides within the feeding apertures 52C-D in a lower portion of the tubular body member 50. Of course, it is contemplated that the feed port members 20 may be removably attached in an upper portion of the tubular body member 50 alone or in combination with feed port members within the middle or lower portion of the tubular body member 50. The feed port members 20A-D are releasably secured within the feeding apertures 52A-D of the side wall 51. Note, the feed port members 20A-D of the present invention are integrally formed with a perch 90. However, it is contemplated that the feed port members 20A-D are separate and detached from the perch 90. In another embodiment, the feed port members 20A-D may have no perch at all.

Figure 2:
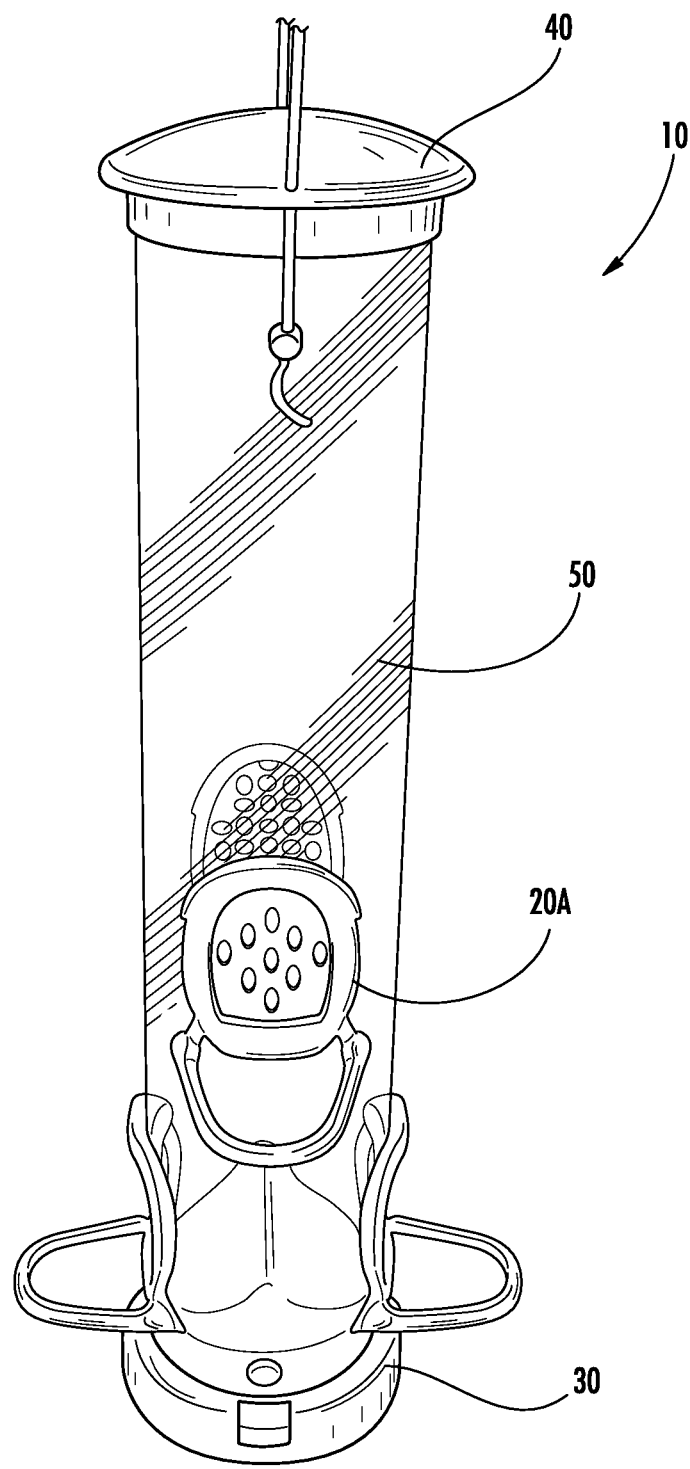
FIG. 2 is a side view of the bird feeder of FIG. 1.
Figure 3:
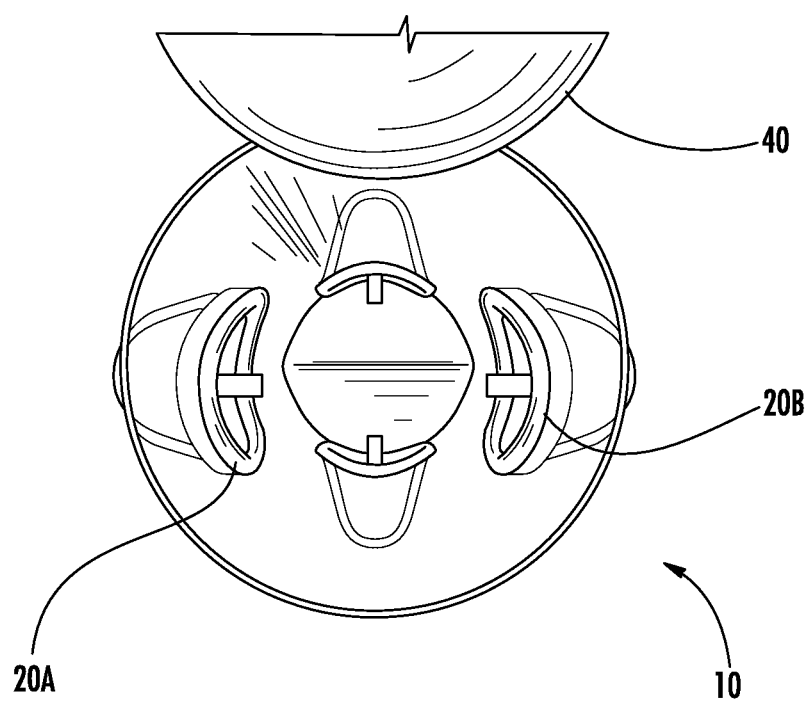
FIG. 3 is a top view of the bird feeder of FIG. 1 with the hinged lid in an open position.
Figure 4:
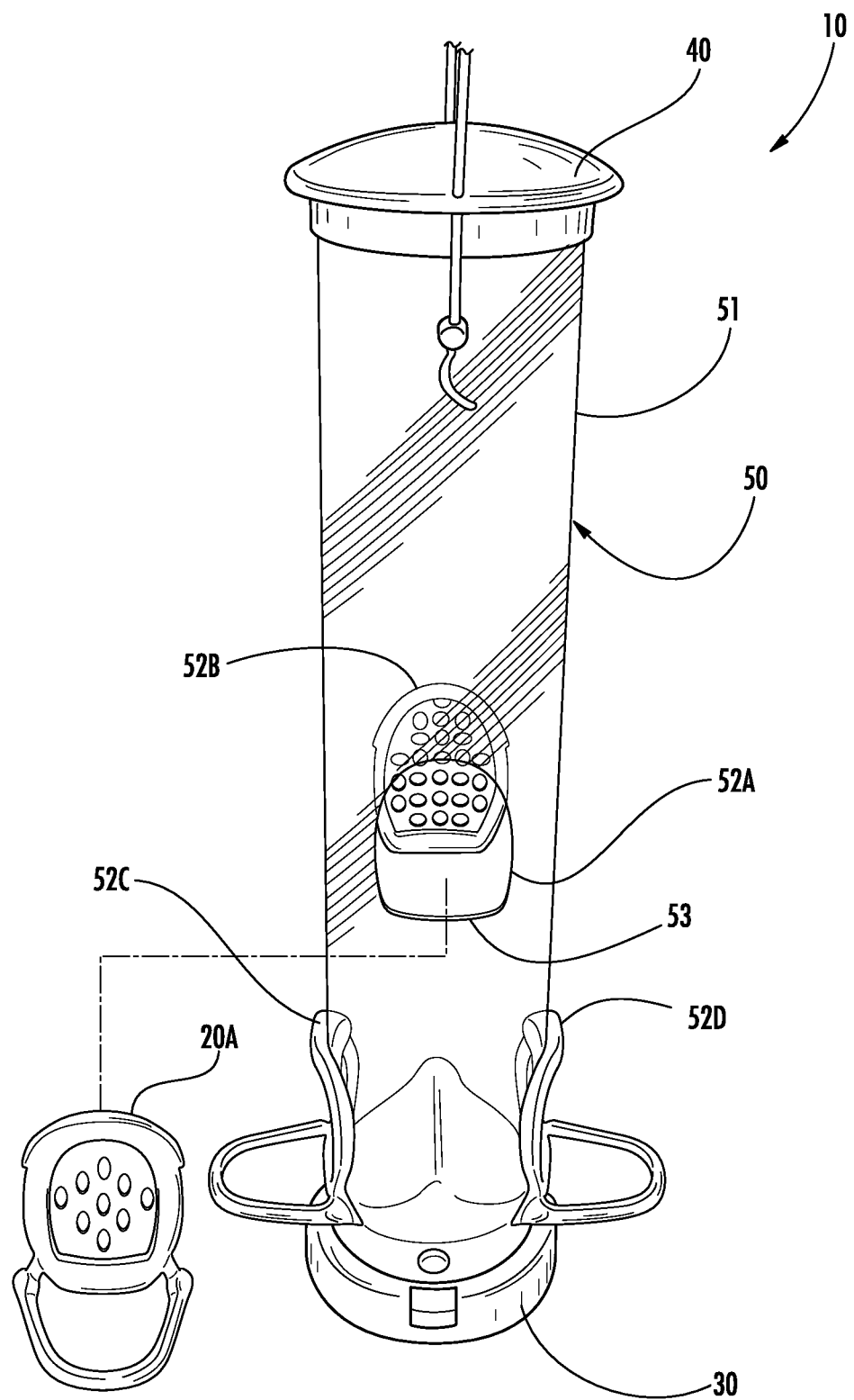
FIG. 4 is a side view of the bird feeder of FIG. 1 with a removable feed port member disengaged from a side wall of the tubular body member.
Figure 5:
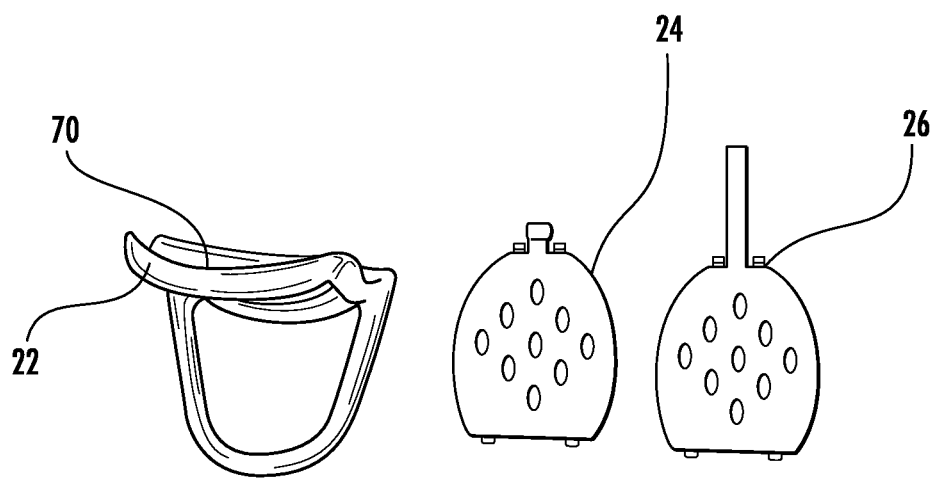
FIG. 5 is a top view of the removable feeder port member of FIG. 4 with a mesh insert disengaged from a frame member of the port member and another mesh insert as originally stamped before a spring-biased portion is formed.
Figure 6:
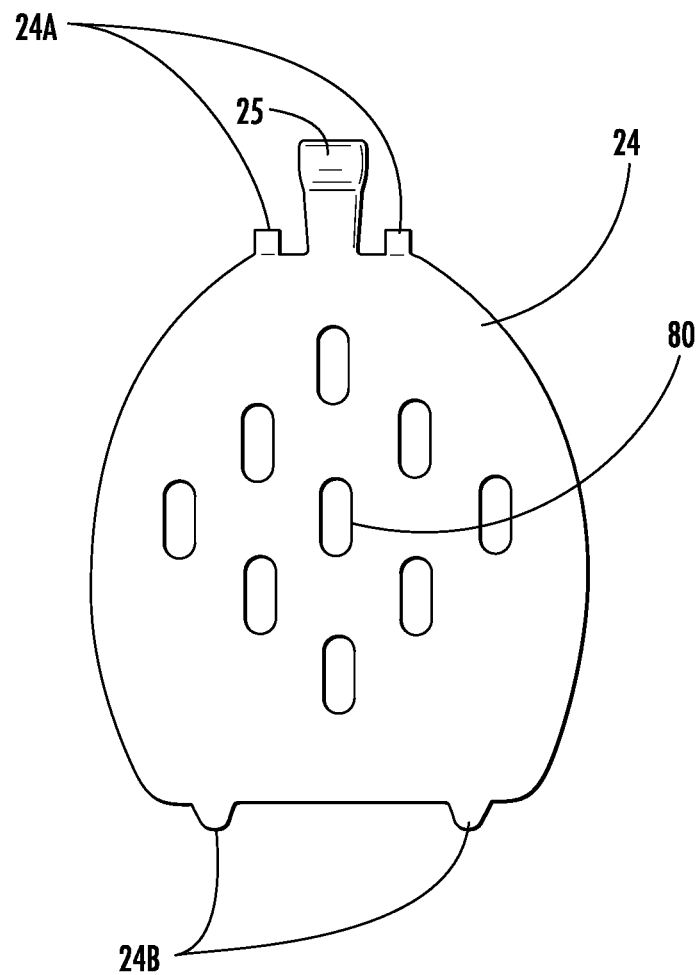
FIG. 6 is top view of the mesh insert of FIG. 5 with the spring-biased portion formed.
Figure 7:
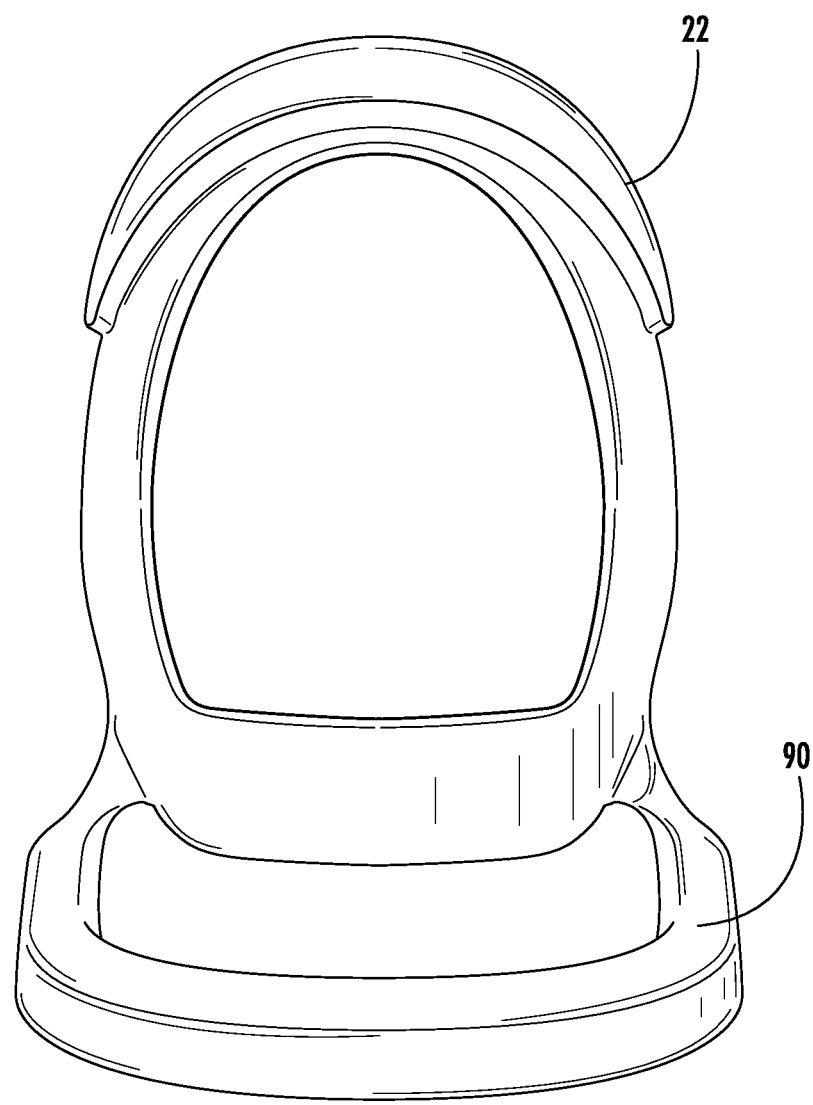
FIG. 7 is front view of the feed port member without the mesh insert.

Referring to FIGS. 2-3, the at least one feed port member 20A-D is interfittingly engaged within at least one feeding aperture 52A-D or sidewall 51 of the tubular body member 50. The feed port member 20A-D with the mesh insert 24 of the present invention is shown releasably secured to the side wall 51 of the tubular body member 50. Referring to FIG. 4, the feed port member 20A-D with mesh insert 24 is detached from the tubular body member 50 to facilitate cleaning and securing a different feed port member 60 or different mesh insert 62. In one embodiment, the feed port members 20A-D are spring-biased within the feeding apertures 52A-D which shall be explained in detail below. Of course, other methods of releasably securing the feed port members 20A-D within the feeding aperture 52A-D are also contemplated. Most importantly, any attachment of the feed port member 20A-D to the side wall 51 must facilitate easy removal from the body member 50 for easy cleaning and adaptation to a bird feed construction.

Figure 8:
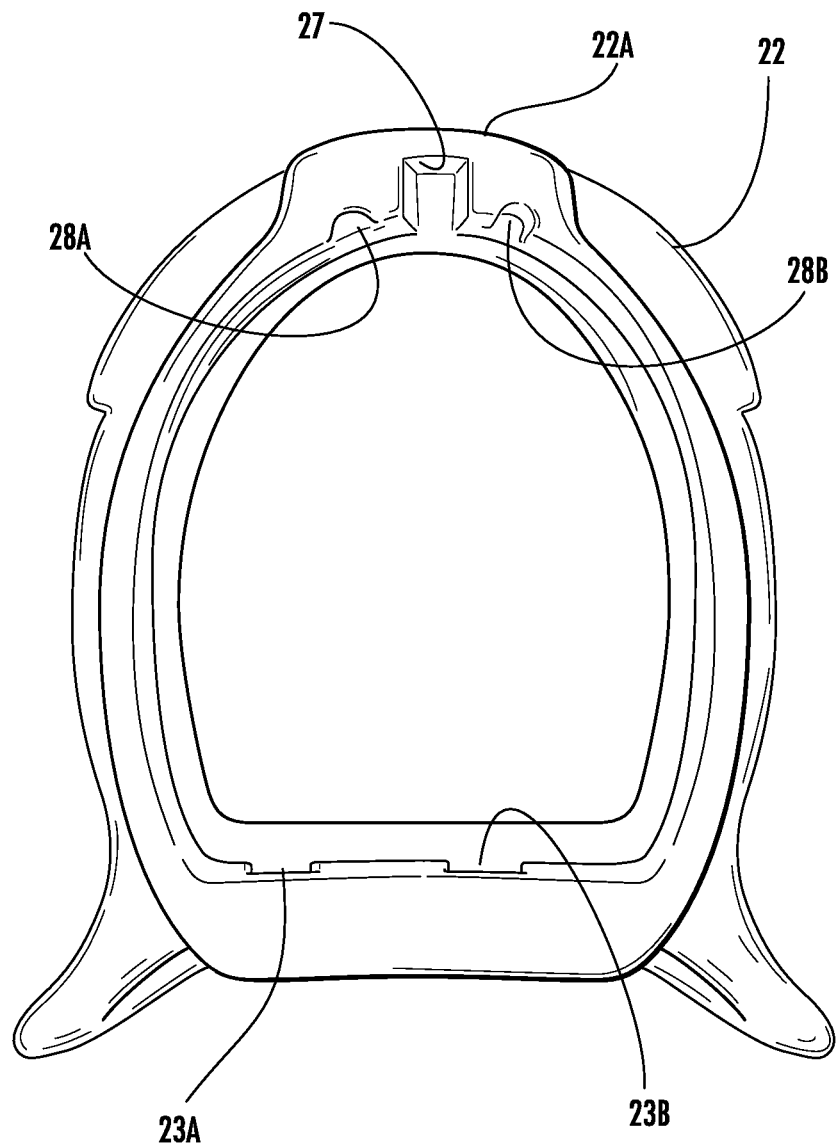
FIG. 8 is a rear view of the feed port member of FIG. 7.
Figure 9:
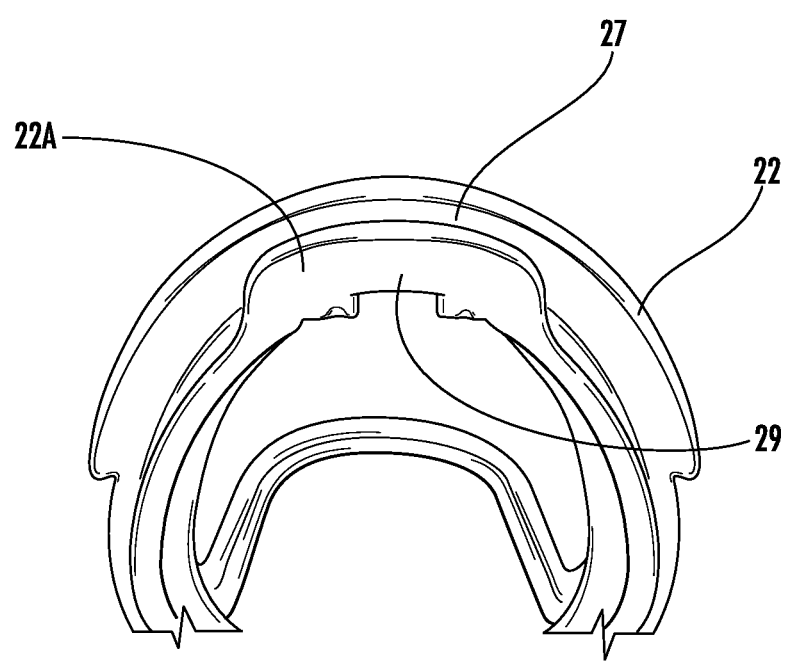
FIG. 9 is a top perspective view of the feed port member of FIG. 8.
Figure 10:
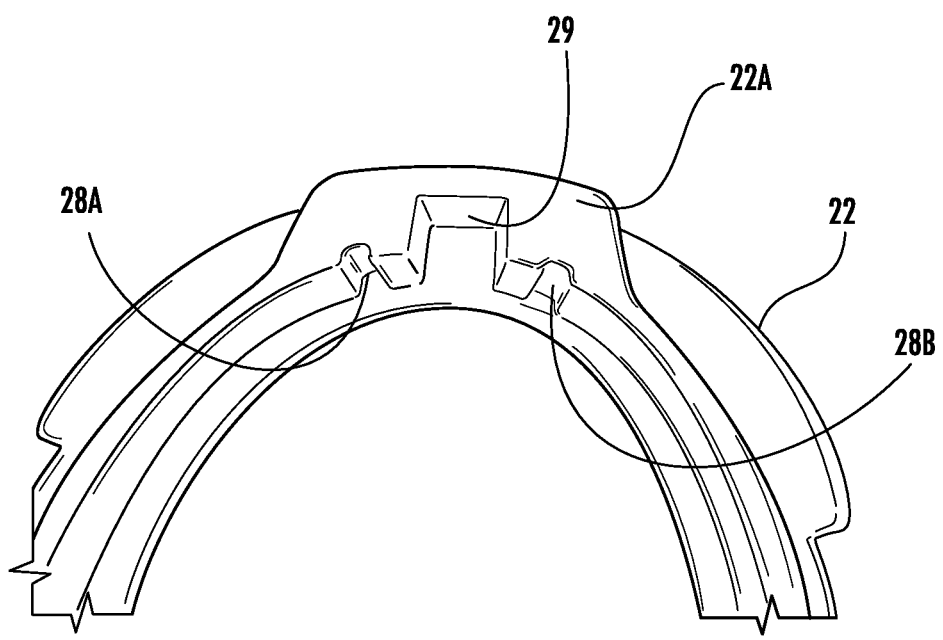
FIG. 10 is a rear view of an upper portion of the feed port member of FIG. 8.
Figure 11:
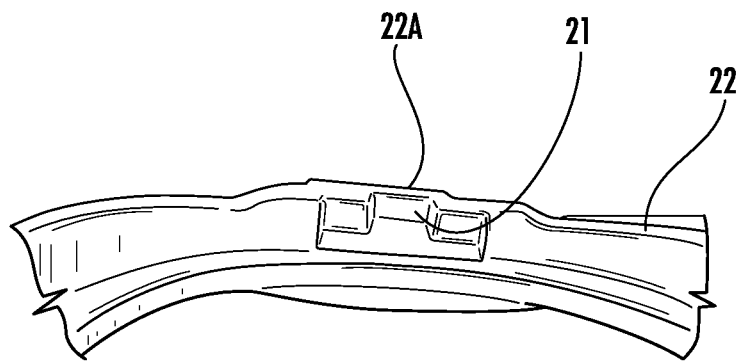
FIG. 11 is a bottom perspective view of the feed port member of FIG. 10.
Figure 12:
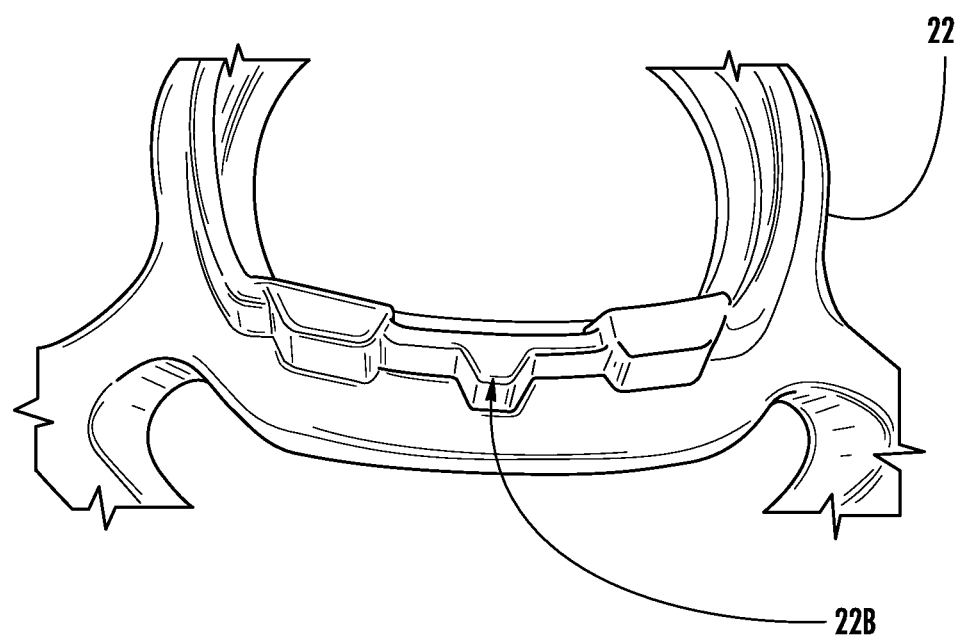
FIG. 12 is a rear view of a lower portion of the feed port member of FIG. 8.
Figure 13:
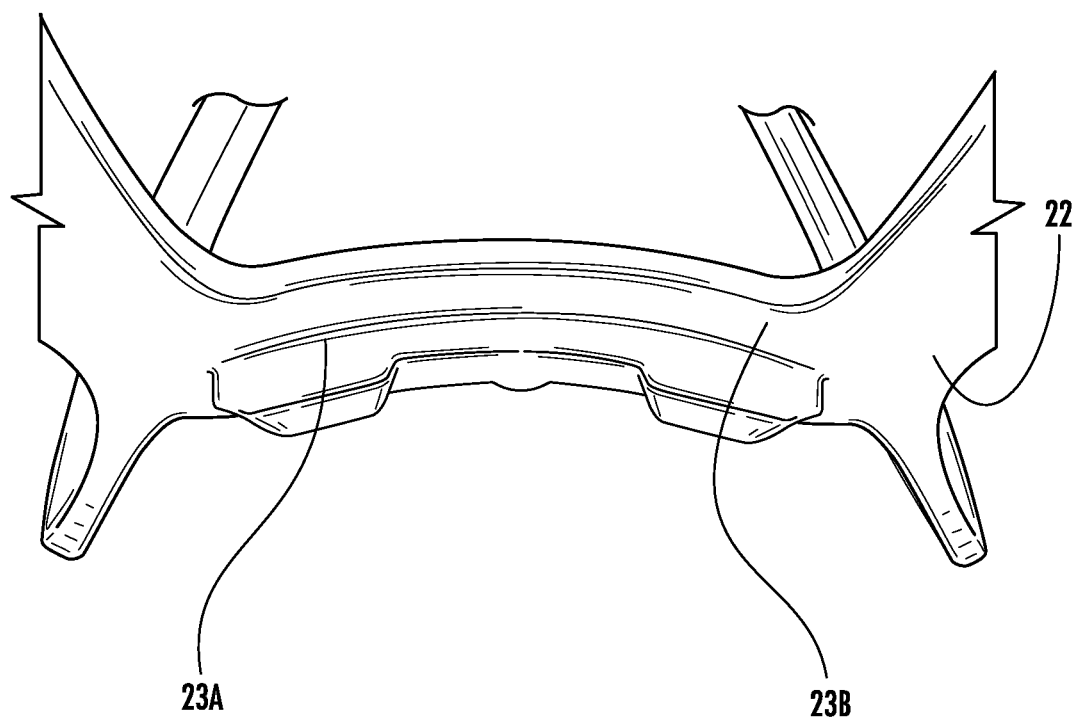
FIG. 13 is a top perspective view of the feed port member of FIG. 12.

Referring to FIG. 5-13, the construction of the feed port member 20 includes a frame member 22 and a mesh insert 24 attached to the frame member 22. The feed port member 20 for a bird feeder 10 includes the frame member 22 releasably secured to a mesh insert 24 that interfittingly engages with the side wall 51 of a tubular body member 50 of the bird feeder 10 when positioned within the feeding aperture 52A-D. Referring to FIGS. 8-9, the frame member 22 includes a groove 27 for seating the frame member 22 within the feeding apertures 52A-D of the tubular body member 50. Referring to FIGS. 10-13, the frame includes upper 22A and lower tab portions 22B for keying the frame to the feeding apertures 52A-D of the tubular body member 50. Also, there may be a cut-out 53 (FIG. 4) about the feeding aperture 52A-D of the sidewall 51 which engages at least one tab portion 22A, 22B to properly orient the frame within the feeding aperture 52A-D. In one embodiment, the cut-out 53 of the side wall 51 engages the lower tab portion 22B of the frame member 22 to key the feed port member 20 to the sidewall 51 of the bird feeder 10.

Figure 14:
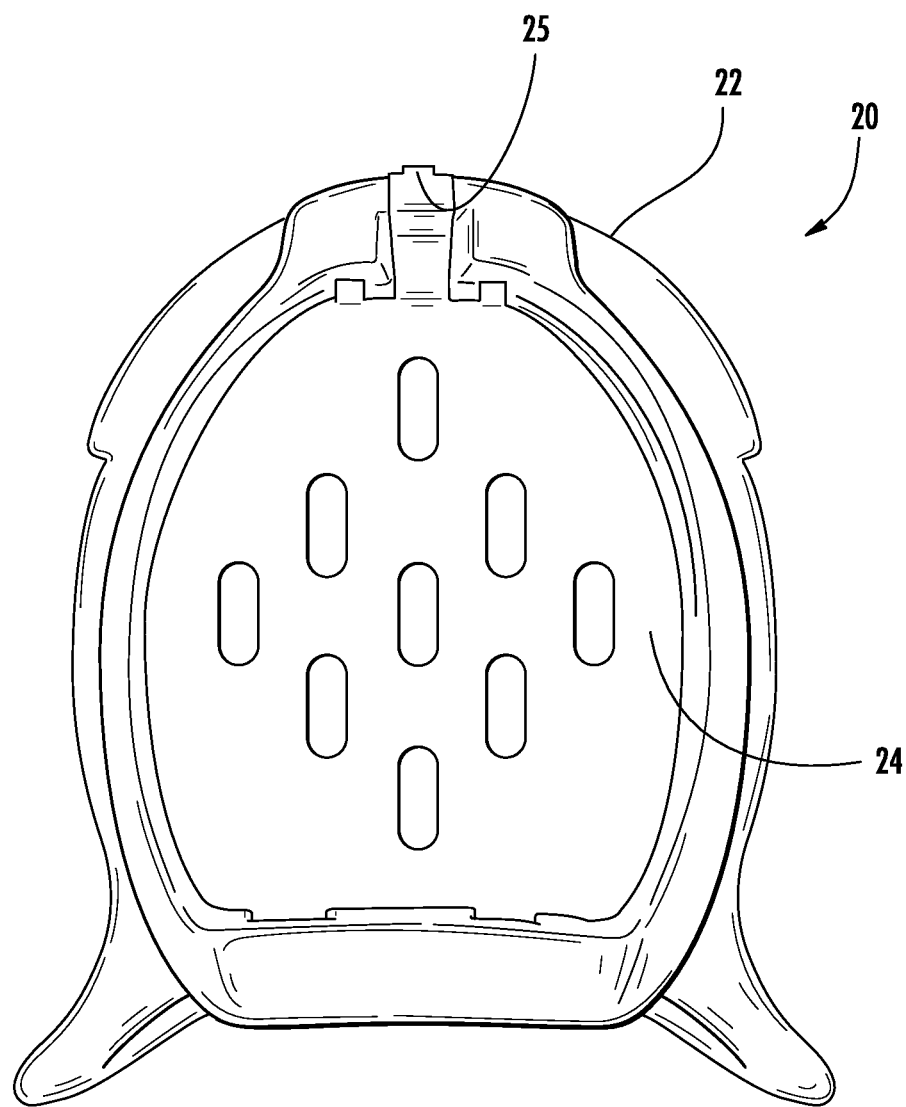
FIG. 14 is a rear view of the feed port member with the mesh insert attached thereto.
Figure 15:
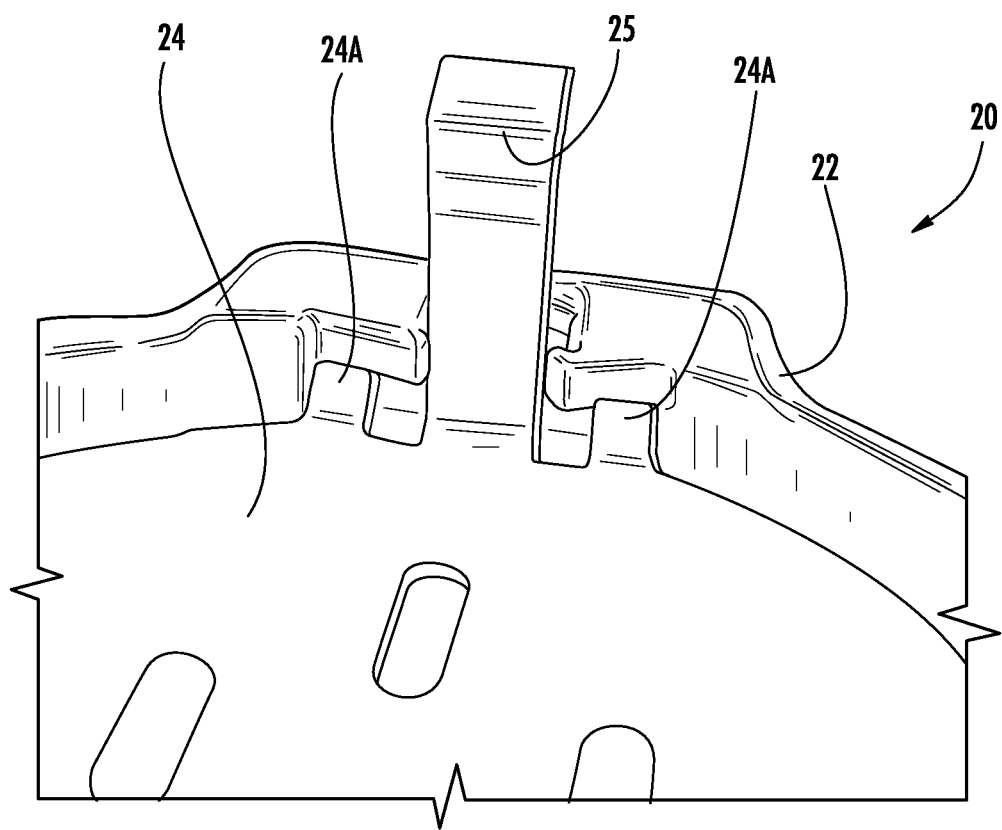
FIG. 15 is a bottom perspective view of an upper portion of the feed port member of FIG. 14.
Figure 17:
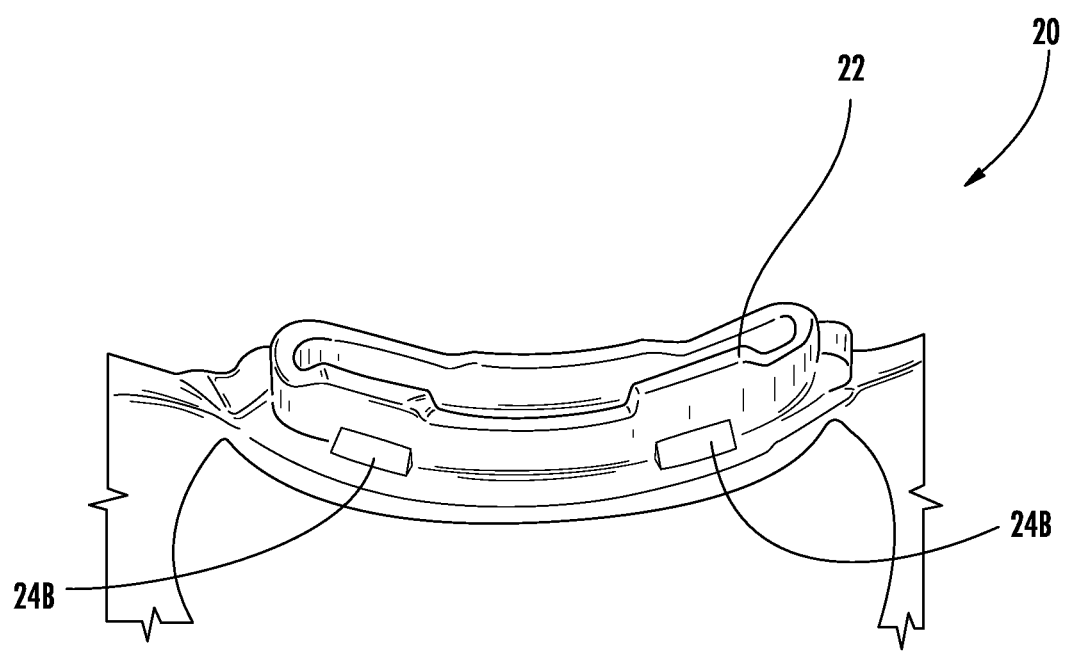
FIG. 17 is a bottom view of the feed port member of FIG. 14.

Referring to FIG. 14, a mesh insert 24 is removably attached to the frame member 22. Of course, the mesh insert 24 may be permanently attached to the frame member 22 as well. Referring to FIGS. 15 and 17, the mesh insert 24 includes a pair of downwardly depending legs 24B and a pair of upper depending legs 24A that releasably engage within seats 23A-B, 28A-B in the frame member 22. The upper depending legs 24A, in one embodiment, are formed along an axis less than 90 degree, preferably 0 to 25 degrees, or substantially perpendicular to the mesh insert 24. The upper depending legs 24A engage seats 28A, 28B within the upper tab portion 22A of the frame member 22 to retain the insert member 24 within the frame member 22. The downwardly depending legs 24B, in one embodiment, are positioned along a 90 degree axis or substantially along a vertical plane similar to the mesh insert 24 for engaging seats 23A, 23B within the lower portion of the frame member 22 to retain the mesh insert 24. Also, the downwardly depending legs 24B may insert through the lower portion of the frame member 22 to facilitate retention of the mesh insert 24 to the frame member 22.

Figure 16:
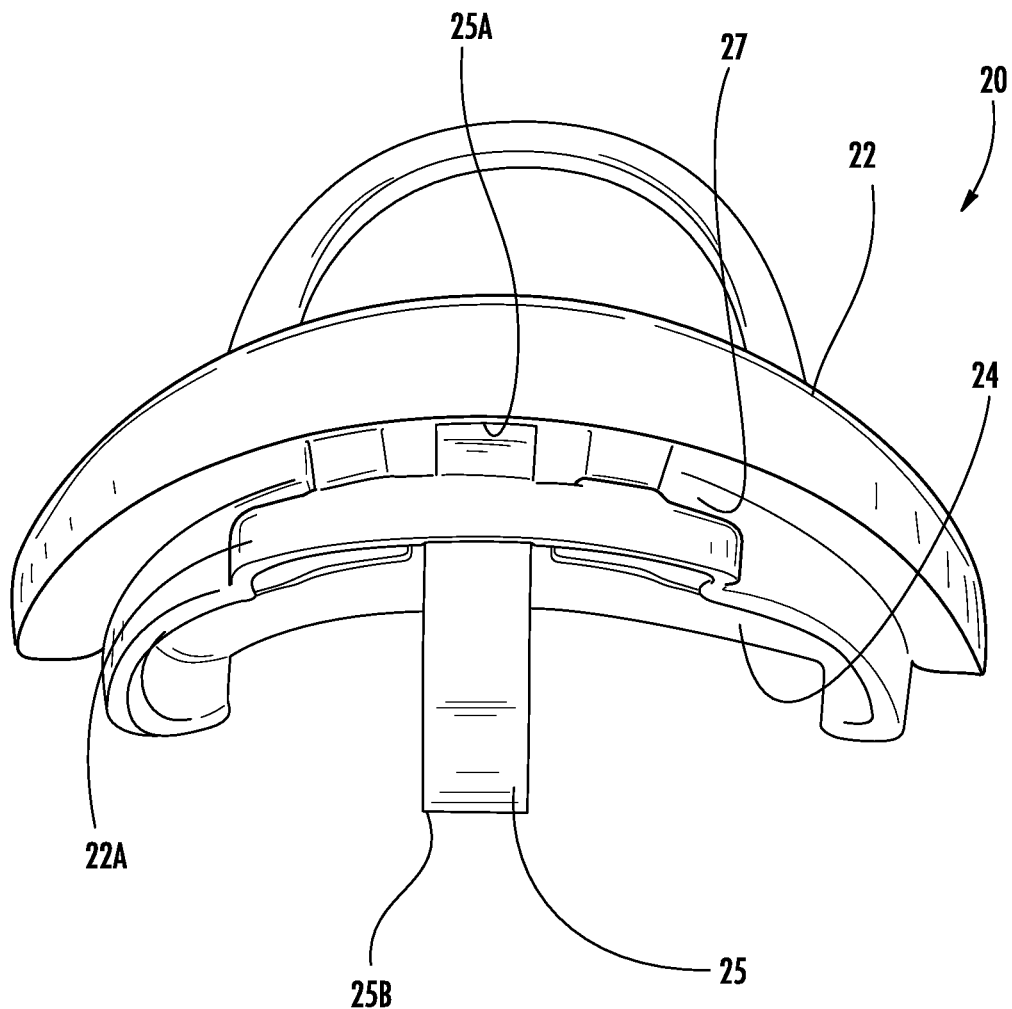
FIG. 16 is a top view of the feed port member of FIG. 14 with the mesh insert attached thereto.
Figure 18:
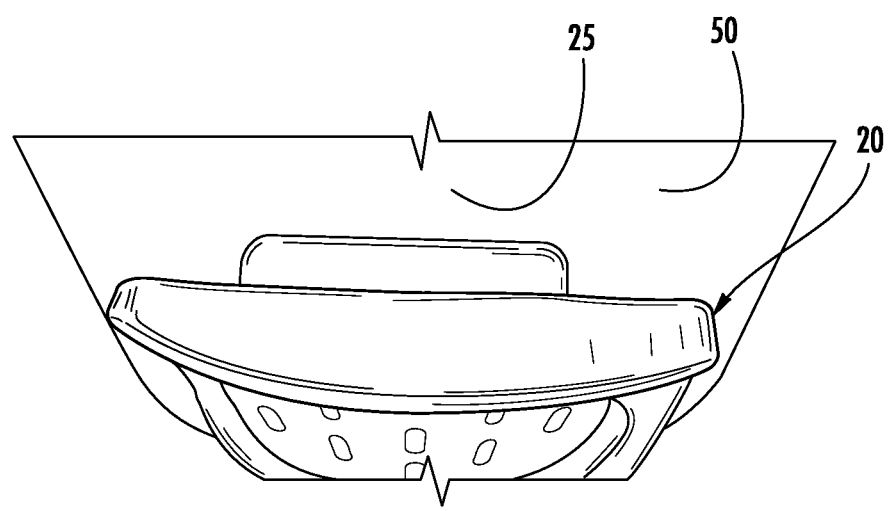
FIG. 18 is a top perspective view of the feed port member of FIG. 14 engaged within a sidewall of the tubular body member.
Figure 19:
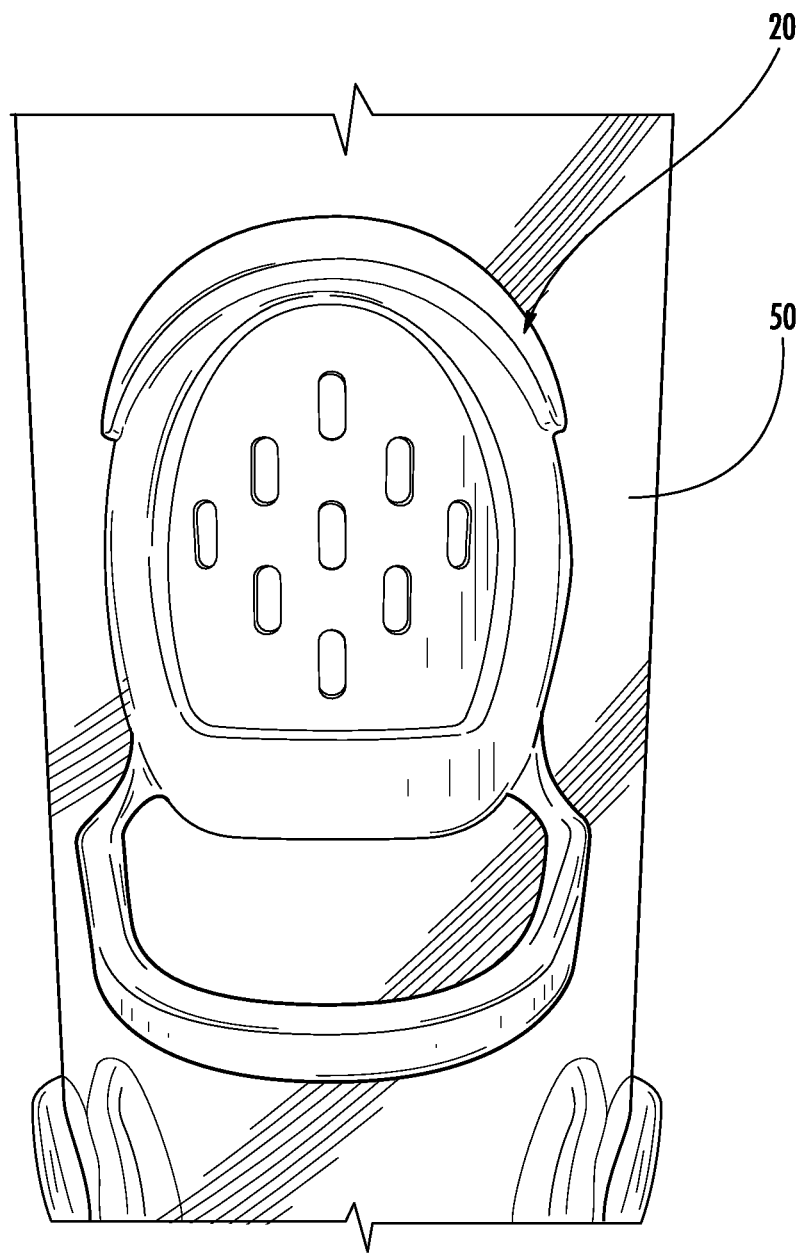
FIG. 19 is a front view of the feed port member of FIG. 14 engaged within a sidewall of the tubular body member.

Referring to FIG. 16, the mesh insert 24 includes a spring-biased portion 25 for engaging an upper portion of the frame member 22 and the sidewall 51 of the tubular body member 50 which acts to releasably secure the mesh insert 24 within the sidewall 51 of the tubular body member 50. The spring-biased portion 25 of the mesh insert 24 is formed by taking the originally stamped mesh insert 26 (see FIG. 5) and folding the spring-biased portion 25 into a shape which may protrude through an aperture 21 in the upper tab portion 22A and reside within the groove 27 of the frame member 22 to engage the sidewall 51. The upper tab member 22A has a cut-out 29 which allows for a range of movement of the spring-biased portion 25 which facilitates the ease of engagement or removal of the feed port member 20 to the sidewall 51. The distal end 25A of the spring-biased portion residing within the groove 27 is configured to receive the sidewall 51 of the body member 50 and retain the sidewall 51 until sufficient force is applied to remove the feed port member 20 from the sidewall 51. In one embodiment, the distal end 25A has a slightly curved surface to guide the sidewall 51 into the groove 27 of the frame member 22. Note, the spring-biased portion 25 has sufficient resiliency or bias to retain the feed port member 20 within the sidewall 51 but still capable of being depressed to remove the feed port member 20 from the sidewall 51. The proximal end 25B of the spring-biased portion 25, when engaged within the sidewall 51, resides within an interior of the bird feeder 10. Referring to FIGS. 18-19, the spring-biased portion 25 of the mesh insert 24 engages the feed port aperture 52 of the tubular body member 50 to releasably secure the feed port member 20 to the sidewall 51 of the bird feeder 10.

Figure 20:
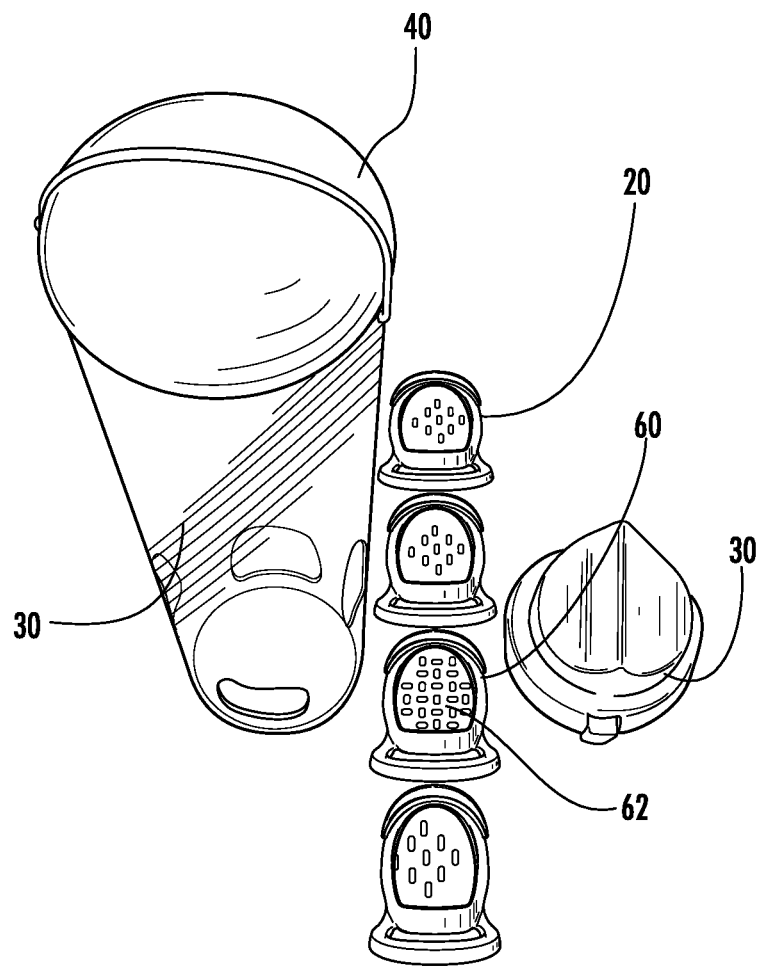
FIG. 20 is a top perspective view of components of a bird feeder including a tubular body member with a hinged lid, a selection of removable feed ports, and a base member.

Referring to FIG. 20, the mesh insert 24 is interchangeable with one or more other types of mesh inserts 24 defining apertures 80 having more than one size to accommodate a range of bird feed mixes. For example, a mesh insert may have smaller sized apertures within the insert for smaller types of bird feed to pass therethrough. Alternatively, a mesh inset may have larger sized apertures within the insert for larger types of bird feed to pass therethrough. The combination of the proper mesh insert 24 and corresponding bird feed will increase the likelihood that a bird will be able to easily retrieve the bird feed from the interior of the tubular body member 50. Of course, a combination of smaller sized apertures and larger sized apertures on a single mesh insert may be used for certain types of bird feed mixes or blend of mixes. Also, a dividing member may be inserted within an interior of the bird feeder 10 to segregate different types of bird feed mix within the interior of the tubular body member 50.

In addition, the mesh insert 24 is interchangeable with one or other types of mesh inserts made of different materials or colors to provide a different ornamental appearance. The mesh inserts 24 are interchangeable with one or other types of mesh inserts made of different materials or colors to provide a different ornamental appearance. For example, a mesh insert 24 may be made of different materials (i.e. brass, copper, steel, plastic, etc.), different colors (i.e. red, green, brown, etc.) to provide a customized and unique look or appearance.

In operation, the feed port member 20A-D can be easily removed from the tubular body member 50 for easy cleaning or adapting to a particular bird feeder 10 construction. A user can remove the feed port member 20A-D by manipulating the spring-biased portion 25 of the mesh insert 24 to disengage from the sidewall 51 of the tubular body member 50 and thereby remove the feed port member 20A-D from the sidewall 51. In addition, once the feed port member 20A-D is removed, the user may clean the feed port member 20A-D and the interior of the tubular body member 50 more easily. Also, as an additional feature, the user may remove or replace the mesh insert 24 with a different type of mesh insert 24 depending upon the size of the bird feed mixes or ornamental appearance. After cleaning or replacing the mesh insert 24, the user may then return the feed port member 20A-D to engage the sidewall 51 of the tubular body member 50 within the feeding aperture 52A-D.

As can be understood, the ability to easily remove a mesh insert 24 and feed port member 20A-D adds greatly flexibility in the manufacture of bird feeders. More specifically, as mentioned above, the feed port member 20A-D and mesh insert 24 can now be used in feeders of different configuration and sizes. For example, the same feed port member 20 can be used for a tubular feeder, a seed tube, thistle tube, peanut feeder and Nyjer mesh by simply adapting the configuration of the mesh insert 24 to suit the given feeder environment, such as a particular aperture size or pattern. Such adaptation of the mesh insert 24 may be to vary the characteristics thereof, such as the slope, height, width, concavity, size of the apertures, number of apertures, proximity of the apertures, and the like, and even color or transparency for aesthetic or attractant purposes. With the present invention, the appropriate mesh insert 24 can be simply releasably secured in place to adapt to the given feeder.

The mesh insert 24 of the present invention is preferably made of metal for ease of manufacture and reduced cost. It may also be metal or a combination of metal and plastic or any other material that is suitable to permit the operation of the mesh insert 24 as described herein.

As illustrated in FIG. 20, the construction of the bird feeder 10 allows for complete disassembly to facilitate cleaning of the bird feeder 10. The base 30, the lid 40, and the feed port members 20A-D, 60 may be removed, permanently or temporarily, from the tubular body member 50 to facilitate cleaning. Once the base 30, lid 40, and feed port members 20A-D, 60 are removed, a user can easily access the interior of the tubular body member 50 with water or other cleaning solutions for more effective cleaning.

It would be appreciated by those skilled in the art that various changes and modifications can be made to the illustrated embodiments without departing from the spirit of the present invention. All such modifications and changes are intended to be covered by the appended claims.

What is claimed is:

1. A bird feeder, comprising:
    a body member for storing bird food having a side wall, the side wall of the body member defining at least one feeding aperture;
    at least one feed port member respectively interfittingly engaged within the at least one feeding aperture, the at least one feed port member including a frame member and a mesh insert removably attached to the frame member;
    the frame member defining an aperture and at least one tab receiving seat;
    the mesh insert including at least one tab releasably secured to the at least one tab receiving seat of the frame member and a retention member emanating from the mesh insert; the mesh insert being releasably secured to the frame member and located substantially within the aperture of the frame member; the retention member being releasably engageable with one of the at least one feed port aperture to releasably secure the frame member to the body member;
    whereby the at least one feed port member is removable from the body member.

2. The bird feeder of claim 1, wherein the mesh insert is interchangeable with one or more other types of mesh inserts defining apertures having more than one size to accommodate a range of bird feed mixes.

3. The bird feeder of claim 1, wherein the mesh insert is interchangeable with one or other types of mesh inserts made of different materials or colors to provide a different appearance.

4. The bird feeder of claim 1, wherein the retention member is a spring.

* * * * *